United States Patent [19]

Vogel

[11] E Re. 29,278

[45] Reissued June 28, 1977

[54] WASTE COMPACTING APPARATUS

[75] Inventor: Rudi Richard Vogel, Kitchener, Canada

[73] Assignee: Sargent Industries, Inc., Los Angeles, Calif.

[22] Filed: Apr. 25, 1975

[21] Appl. No.: 571,682

Related U.S. Patent Documents

Reissue of:

[64] Patent No.: 3,734,005
Issued: May 22, 1973
Appl. No.: 219,032
Filed: Jan. 19, 1972

[52] U.S. Cl. ..... 100/52; 100/49; 100/51; 100/229 A; 100/269 R; 100/295; 100/179

[51] Int. Cl.[2] ..... B30B 15/18; B30B 15/22

[58] Field of Search ..... 100/49, 50, 51, 52, 100/269 R, 229 A, 295, 179

[56] References Cited

UNITED STATES PATENTS

| | | | |
|---|---|---|---|
| 3,384,007 | 5/1968 | Boje et al. | 100/49 |
| 3,603,245 | 9/1971 | Pioch | 100/50 |
| 3,608,476 | 9/1971 | Price et al. | 100/50 X |
| 3,621,775 | 11/1971 | Dedio et al. | 100/295 X |

*Primary Examiner*—Billy J. Wilhite
*Attorney, Agent, or Firm*—Ellsworth R. Roston

[57] ABSTRACT

Waste compacting apparatus comprising a hopper; a compaction tunnel communicating with the hopper and providing an outlet for waste deposited therein; a packer located and reciprocable through successive forward and return strokes to advance waste from the hopper into and through said compaction tunnel, a ram, forming part of said packer, normally telescoped therein and retractably extendible therefrom in the direction of reciprocation of said packer, the ram having a leading end which forms a small portion of that of the packer as a whole when the ram is telescoped therein; motor means for reciprocating said packer through successive cycles of operation respectively comprising forward and return strokes, a standard cycle of operations commencing at a lead-off position with the ram telescoped in the packer and re-cycling means, responsive to mechanical stalling of the packer in the forward stroke of a standard cycle of operations, for terminating the forward stroke, returning said packer to its lead-off position, and initiating a special cycle of operations comprising forward and return strokes in which the forward stroke is effected with the ram extended.

25 Claims, 13 Drawing Figures

WASTE COMPACTING APPARATUS

Matter enclosed in heavy brackets [ ] appears in the original patent but forms no part of this reissue specification; matter printed in italics indicates the additions made by reissue.

This invention relates to improvements in waste compacting apparatus and in particular to waste compacting apparatus employing plural compacting devices.

The apparatus of particular concern to the present invention is of the type in which waste is compacted by pushing it through a tunnel of progressively reducing cross-section; this operation being performed by a packer blade which advances waste from a communicating hopper into and through the tunnel; the waste being resultantly compressed into a dense mass when it is discharged from the tunnel.

As will be appreciated, the waste may become impacted in the tunnel for any of a variety of reasons thus stalling the packer blade and necessitating extraordinary measures for breaking the resultant impasse.

In one known and typical prior construction, the packer blade was a composite structure which included a ram whose leading end or thrusting head formed a part of the leading end or thrusting head of the packer blade as a whole. In said construction, as and when the packer blade was stalled by an impasse as aforesaid, the ram which was normally telescoped in the packer body was activated to apply increased force to a localized zone of the impacted waste in order to break the impasse.

Stated more explicitly, the prior art over which the present invention seeks to improve comprised a packer blade with a leading end or thrusting head of relatively large area by which it advanced waste from a hopper into and through a compaction tunnel. However, when the waste became impacted in the tunnel (which is inescapable in all of the relevant circumstances), the resultant mass was attacked by a small component of the packer blade namely, the ram, in an effort to break through it and so to relieve the impasse.

The concept of waste compaction generally typified by the described prior construction, appears to be reasonably efficient in principle. However, the invention seeks to provide a waste compaction apparatus generally employing this principle but doing so in a more effective and reliable manner; this constituting a main object of the invention.

As an example of the area of improvement visualized by the invention, it was a practice in past constructions of this type to maintain the entire packer blade in engagement with the impacted mass while the latter was being attached by the ram as aforesaid. To a degree, this frustrated the efforts of the ram by restricting ram-induced movement of the mass which was not only desirable but necessary to facilitate breaking through the impasse. Accordingly, it is a more specific object of the invention to provide apparatus as aforesaid which is constructed to effect and maintain disengagement of the packer from the impacted mass while the ram is operating thereon to break the impasse.

In the embodiment chosen for the purposes hereof, the invention comprises a hopper; a compaction tunnel communicating with the hopper and providing an outlet for waste deposited therein; a packer located and reciprocable through successive forward and return strokes to advance waste from the hopper into and through said compaction tunnel, the waste being compacted in its transit through said tunnel; a ram, forming part of said packer, normally telescoped therein and retractably extendible therefrom in the direction of reciprocation of said packer, the ram having a leading end which forms a small portion of that of the packer as a whole when the ram is telescoped therein; motor means for reciprocating said packer through successive cycles of operation respectively comprising forward and return strokes, a standard cycle of operations commencing at a lead-off position with the ram telescoped in the packer and recycling means, responsive to mechanical stalling of the packer in the forward stroke of a standard cycle of operations, for terminating the forward stroke, returning said packer to its lead-off position, and initiating a special cycle of operations comprising forward and return strokes in which the forward stroke is effected with the ram extended.

Other objects of the invention more or less broad than the foregoing and both specified and obvious will become apparent from the following description, the elements, parts and principles of the invention given herein solely by way of example and with reference to the accompanying drawing wherein like reference devices identify like parts throughout the several views and wherein.

Figure 1:
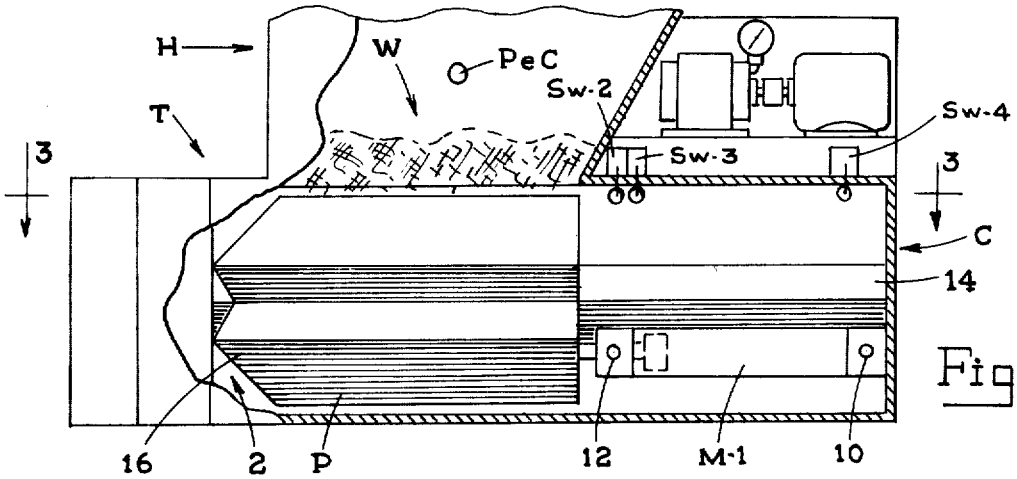
FIG. 1 is a side elevational view of the waste compacting apparatus according to the present invention with a section of the side removed exposing the packer in its parked position within the hopper.

As shown in FIG. 1 of the drawing, waste compacting apparatus according to the present invention is contained in a cabinet C and comprises a conventional hopper H into which waste W is deposited in a conventional manner — e.g., manually, by duct, or otherwise. A compaction tunnel T communicates with hopper H and provides the outlet for waste deposited in the latter. Said compaction tunnel T shown in FIGS. 2 and 3 is an elongated chamber, open at both ends, and with a cross-section which reduces progressively over a portion, at least, of the tunnel length as particularly shown in FIG. 3 so that waste advanced therethrough into a waiting bag is compacted into a dense mass; the widest point of the compaction tunnel T being at its inlet end 2 which communicates with hopper H.

Figure 2:
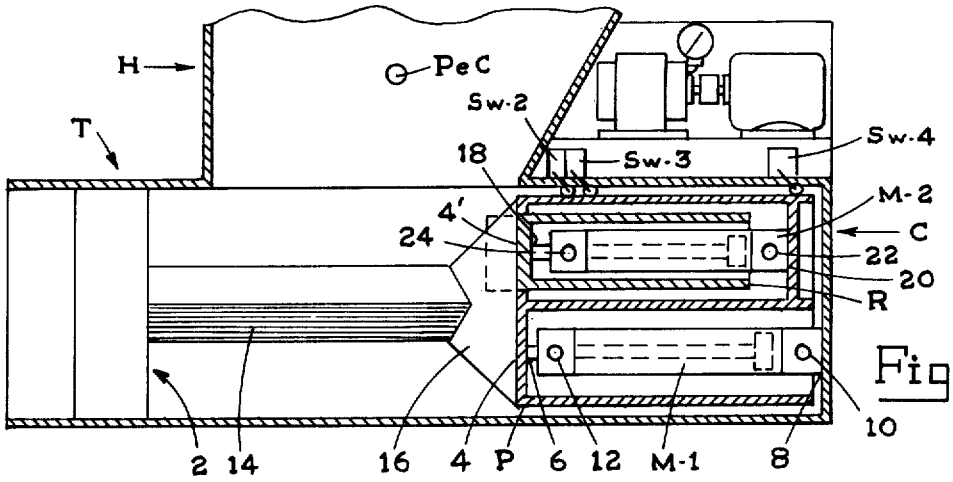
FIG. 2 is a cross-sectional view along the longitudinal axis of the waste compacting apparatus according to the present invention showing the packer with its telescoped ram at the lead-off position.
Figure 3:
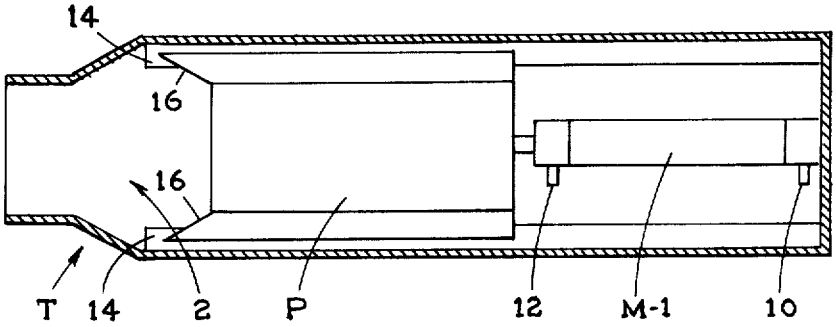
FIG. 3 is a top plan view taken along line 3—3 of FIG. 1 showing the packer in its parked position adjacent the tunnel inlet.

The packer P forming part of the invention is arranged, in this embodiment, to reciprocate across the bottom of hopper H in direct axial alignment with tunnel T; said packer P having a lead-off position on one side of the hopper H which is diametrically opposite the tunnel T as shown in FIG. 2. In area, the leading end or thrust surface for packer P corresponds generally to the area of the inlet 2 of tunnel T which is of course its widest area; the cross sectional area of said tunnel T reducing progressively from its inlet end 2 to its outlet.

Packer P is reciprocable by means of a motor M–1 — in this case, of the piston and cylinder type — through successive cycles each comprising a forward stroke from the leadoff position of FIG. 2 to the tunnel inlet 2 and a return stroke from tunnel inlet 2 back to the lead-off position; waste from the hopper H being advanced on each forward stroke into and through said compaction tunnel T to a waiting bag (not shown); the waste being compacted in its transit through said tunnel T.

A ram R forms part of packer P; said ram being normally telescoped in packer P and retractably extendible therefrom in the direction of its reciprocation; the leading end 4' of said ram R forming a component portion of the leading end 4 of the packer P as a whole when the ram R is telescoped therein.

The present waste compacting apparatus includes in its construction a variety of electrical and hydraulic systems and controls which govern its operation and procure execution by it of the movements hereinafter described.

The precise nature and interconnection of the systems and controls employed herein is of little relevance to this submission inasmuch as they are of fairly well-known and conventional character to begin with and, in addition, are certainly susceptible of wide variation without decreasing the efficiency of the present apparatus. Detailed reference to said systems and controls will accordingly be omitted herefrom for the sake of brevity and clarity and in favor of more particular reference to those aspects of the present invention which are especially novel and innovative.

In the preferred embodiment of the invention as shown in FIGS. 1 and 3, packer P with ram R telescoped therein is normally parked in its forward position at the bottom of hopper H in close proximity to tunnel inlet 2. Motor M–1, by which the packer P is reciprocated as above noted, is attached by one of its ends to said packer P as at 6 (FIG. 2) and is attached by its opposite end as at 8 to cabinet C housing the apparatus. Forward and return hydraulic flow lines 10 and 12, respectively, are connected between said motor M–1 and valve 110 shown in FIG. 13 which forms part of the hydraulic system aforesaid.

Preferably, packer P is reciprocated along guide rails 14 in hopper H and its leading end 4 is rendered scoop-shaped by lateral horns 16—16 as viewed in FIGS. 2 and 3 for collecting waste from the hopper and channelling it into said tunnel T.

Figure 13:
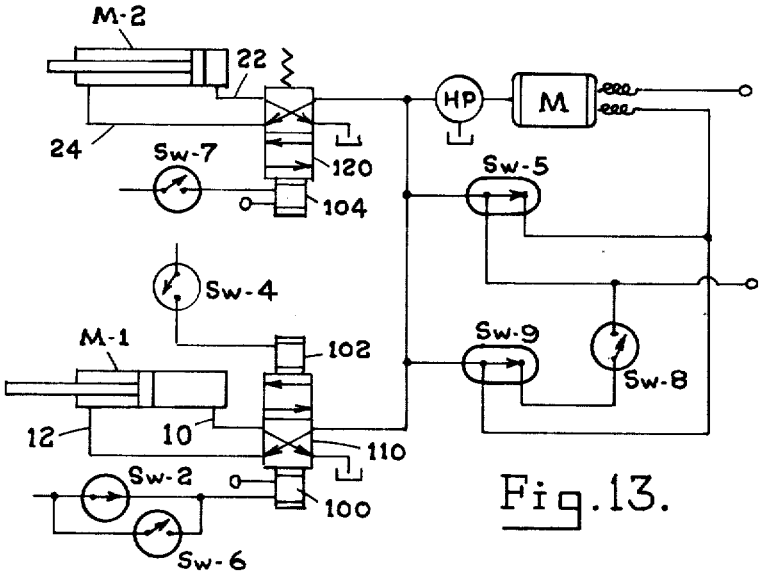
FIG. 13 is a schematic view of the hydraulic system employed in the present embodiment of the invention with certain of the components depicted in FIG. 12.

Ram R is telescoped in and retractably extendible from packer P by a motor M–2 which may also be of the piston-cylinder type, attached by one of its ends to said ram R as at 18 and by its opposite end to said packer P as at 20. Forward and return hydraulic flow lines 22 and 24, respectively, are connected between said motor M–2 and a spring loaded flow reversing valve 120 as shown in FIG. 13.

Dealing now with the operation of the present waste compacting apparatus, it will be recalled that the parking or at-rest position of the packer P is at the bottom of hopper H in close proximity to inlet 2 of tunnel T. Exemplary advantages of parking the packer P in this position are that it blocks odors originating in tunnel T from backing up through hopper H while also maintaining compression of waste in tunnel T. Thus, waste deposited in hopper H piles up, initially, on packer P as in FIG. 1 which actually fills the bottom of the hopper H; the operation of the apparatus being then initiated by photo-electric cell PeC when it senses waste W in the hopper H; said photo-electric cell PeC being incorporated in the controls of the present apparatus.

Once it is switched into operation by photo-electric cell PeC, packer P is then moved by motor M–1 through a return stroke to the lead-off position as shown in FIG. 2 diametrically across hopper H from tunnel T; waste W previously accumulated in hopper H being thereupon allowed to drop to the bottom thereof in front of the leading end 4 of the packer P. Said motor M–1 is then activated by appropriate electrical and hydraulic control devices of the respective systems to initiate the forward stroke of the packer P as shown by the arrow and dotted lines in FIG. 5 in which the waste material in front of it is scooped up and advanced toward and into compaction tunnel T.

It will be appreciated that when this material is forced into said tunnel T, it is retained therein by the compressive force which the tunnel T exerts thereon so that it will not spill back into hopper H as and when packer P is withdrawn from tunnel inlet 2.

At all events, the arrival of packer P at tunnel inlet 2 marks the end of a cycle of operations and appropriate switches are then activated to procure deenergization of motor M–1; the packer P being thus left in this advanced position at tunnel inlet 2 which is also its at-rest or parking position previously described; said packer P remaining in its at-rest position unless and until reactivated by photo-electric cell PeC when it senses waste in the hopper H.

In summary, therefore, upon sensing waste in hopper H, photo-electric cell PeC triggers a cycle of operations of the present apparatus in which packer P is first returned from its at-rest position to its lead-off position and from which it is thereafter stroked forwardly towards the at-rest position at which it halts unless and until triggered again as aforesaid by photo-electric cell PeC for example; waste W in hopper H being swept up by the packer P in each said forward stroke and advanced into tunnel T where it is compressed and compacted as aforesaid; the compacted waste W in tunnel T being displaced and ejected by new material as and when it is introduced into tunnel T by packer P in a manner which will be understood.

Figure 11:
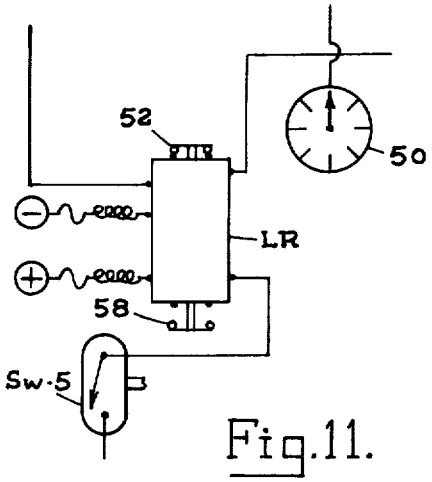

Upon the development of an impaction which it is beyond the ordinary power of packer P to dislodge in the forward stroke of a normal cycle of operations, it will become stalled before it reaches its at-rest position which is sensed in this embodiment by a build up of hydraulic pressure to motor M-1 causing a pressure sensitive switch Sw-5 communicating with the appropriate hydraulic line to open as shown diagrammatically in FIG. 11, thus stopping the pump HP and resultantly aborting or terminating the forward stroke of packer P then in theoretical progress; thereafter other means to be described being provided for procuring the return of packer P to its lead-off position.

Figure 6:
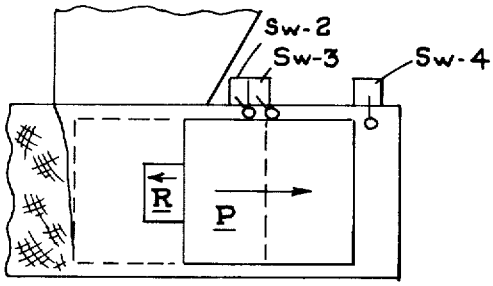
FIG. 6 is a diagrammatic side view of the packer in a stalled position as shown by dotted lines and in a return stroke shown by the return arrow and solid lines with the ram extending therefrom as shown by the forward arrow and solid lines.

Preferably, ram motor M-2 is also activated at the same time by appropriate control devices in the electrical and hydraulic systems to extend ram R from packer P while the latter is in its return stroke to lead-off position substantially as shown in FIG. 6; this return stroke forming part of a special cycle of operations which is initiated when the stalling of packer P is first sensed by a timer 50. The forward stroke of said special cycle of operations is then commenced with the ram R substantially fully extended from packer P as in FIG. 7; this stroke being completed, for example, when packer P reaches its at-rest position upon which event all systems will be shut off and reset for normal operations. After completing the forward stroke of a special cycle of operations, the packer P reaches its at-rest position with the ram R extended and dwells there in this fashion until reactivated — e.g., by photo-electric cell PeC.

Assuming, however, that the impasse or impaction is beyond the capacity of the ram R to break in one thrust, this will be signified by the stalling of the forward stroke which will also be sensed by the controls and systems aforesaid — e.g., switch Sw-9; the forward stroke then in progress being thereupon terminated and packer P returned to lead-off position in the return stroke of the special cycle of operations which is then instituted and during which the ram R may be retracted.

At all events, irrespective of the circumstances under which the packer P is returned to lead-off position — i.e., whether or not the forward stroke is fully completed — said controls and systems will preferably procure retraction of the ram R into packer P while the latter is returning to lead-off position and the next ensuing forward stroke of packer P will be effected with the ram R retracted as in FIG. 2 in a normal cycle of operations.

When and if an impasse has been broken, operation of the compacting apparatus will thereafter proceed in the normal manner until the packer P is stalled by another impasse. Conversely, if a previous impasse has not been broken, that fact will be duly sensed in the manner hereinbefore described and the system will thereagain switch over thereafter to special operation with the ram R extended as described.

It is noteworthy, incidentally, that if the impasse is not broken on the first attempt, residual waste W in hopper H will be swept up by the packer P on its next forward stroke and added to the impacted mass thereby changing its characteristics and, conceivably, facilitating the work of the ram R on its next and immediately following impaction-breaking effort.

In particular, however, it will be observed that the main body of packer P is not in contact with the waste W in tunnel inlet 2 while ram R is being operated to break an impasse thereby permitting movement in the impacted mass in response to the thrusting efforts of ram R and, hence, facilitating the breaking of the impasse.

Thus, in further summary, under normal operative conditions, packer P is moved through forward and return strokes to advance waste from the hopper H into and through tunnel T. These strokes being carried out with the ram R retracted and telescoped in packer P under which conditions the packer is herein considered to be reciprocated through normal cycles of operation comprising said forward and return strokes although not necessarily in that order.

When and if the completion of a forward stroke is prevented by an impasse, however caused, re-cycling means included in and forming part of the apparatus will sense the resultant stalling of the packer P and thereupon initiate a special cycle of operations in which the packer P is returned to lead-off position from which it then advances in a special forward stroke with the ram R extended to break the impasse.

Whether said special forward stroke as then completed or interrupted, the apparatus will then be switched over for normal operation and will continue to operate normally until another impasse is sensed on a subsequent forward stroke.

Although it is not deemed necessary or desirable to expatiate at length upon the electrical and hydraulic systems and associated controls which form part of the present apparatus, it may, nevertheless, be useful to show parts of these systems and controls in more or less diagrammatic and skeletal fashion.

The drawing illustrates in FIGS. 4-7 generally diagrammatic views of packer P at various stages in its operation and for the sake of clarity, the packer P is shown in each of these views in rectangular block form without horns 16—16.

Figure 12:
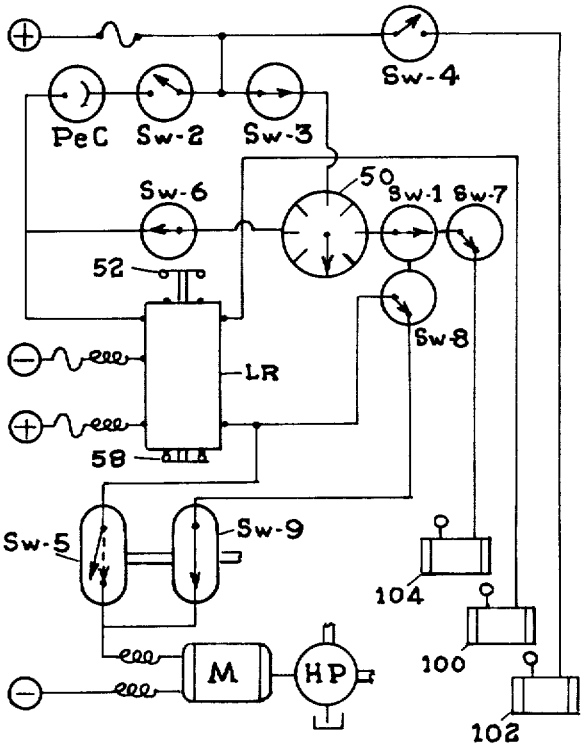
FIG. 12 is a generally schematic view of the full complement of switches in the electrical system and certain other components of the means provided for controlling the movements of the packer and ram.

The full complement of switches in the electrical system and certain other components of the means provided for controlling the movements of packer P are shown in generally schematic and symbolical form in FIG. 12; fragmentary diagrams showing the attitudes of these various components at different points in the cycling of packer P are provided by FIGS. 8-11. In FIG. 13 is shown the hydraulic system with certain of the components depicted in FIG. 12. Generally, the said components will be readily indentifiable by the symbols employed in the drawing. However, some are deemed to merit special comment.

Figure 9:
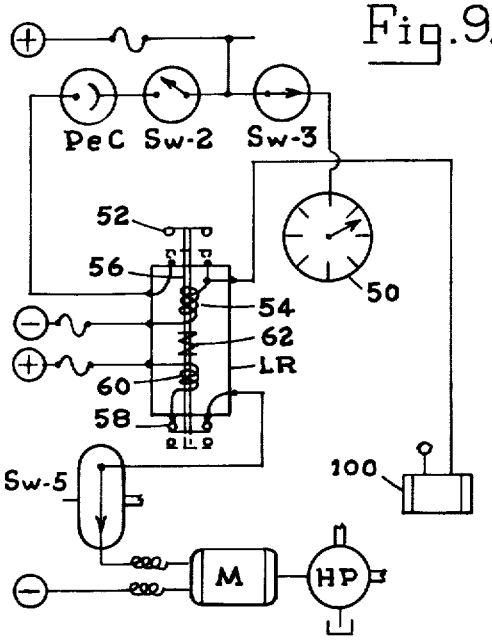

For example, the invention includes a latch relay LR which is shown schematically in FIG. 9 of the drawing and in block form in other views. This is a well known type of relay which is activated initially by a relatively feeble impulse to close a circuit to a heavy load; the relay remaining closed so long as it continues to be loaded and re-opening only when the load is disconnected from the circuit.

In the simple example of FIG. 9, it will be observed that the latch relay LR may be provided with a circuit breaker 52 through which photo-electrical cell PeC communicates with solenoid coil 54 for moving armature 56 to open circuit breaker 52 and, simultaneously, to close a heavy duty circuit breaker 58 in the circuit of motor M which includes a second solenoid coil 60 which is thereby energized to keep said heavy duty circuit breaker 58 closed for so long as the motor circuit is complete. Said motor circuit also includes pressure switch Sw-5 which is connected to the hydraulic system; said pressure Sw-5 being biased to closed position but being also designed to open thus opening the motor circuit when the hydraulic pressure attains a specific level.

In turn this procures re-opening of said heavy duty circuit breaker 58 and the simultaneous re-closing of circuit breaker 52 under bias of spring 62.

The invention also avails itself of an indexing or pulsing switch Sw–1 which is activated to open upon every other off-cycle of pump motor M. Stated another way, switch Sw–1 will remain closed on one off-cycle of the pump motor M and will open on the next off-cycle; reclosing again on the next ensuing on-cycle and so on.

Figure 4:
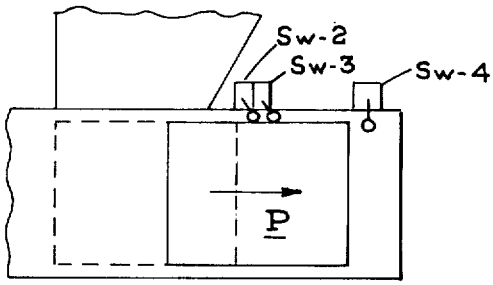
FIG. 4 is a diagrammatic side view of the packer in its parked position as shown by dotted lines and in a return stroke as shown by the arrow and solid lines.
Figure 8:
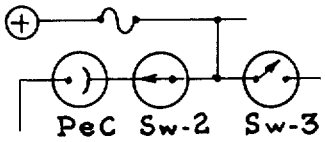
FIG. 8–11 are fragmentary diagrams of the electrical system showing the attitudes of switches and certain other components of the means provided for controlling the movements of the packer.

Beginning at the parking position of the packer P illustrated in FIG. 1 and by the dotted lines in FIG. 4, the corresponding schematic circuit shown in FIG. 8 reveals that, at this point, switch Sw–2 is closed to activate the circuit of photo-electric cell PeC to enable it to detect and react to waste W in hopper H.

When this occurs, one of the results which follow is that latch relay LR is activated to initiate operation of pump motor M much as shown in the schematic view of FIG. 9. In addition, solenoid 100 will also be activated to set valve 110 shown in FIG. 13, at retract position causing packer P to commence a return stroke as indicated by the arrow and the solid lines in FIG. 4.

A further sequel to the return stroke of packer P is that switch Sw–2 is now opened while switch Sw–3 to the timer 50 is closed. This puts the timer 50 into operation so that after a predetermined lapse of time, it will close switches Sw–6, Sw–7 and Sw–8 as hereinafter described.

Figure 5:
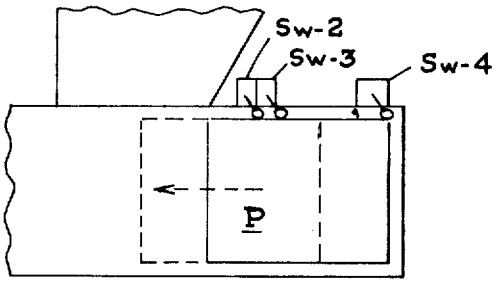
FIG. 5 is a diagrammatic side view of the packer at its lead-off position as shown in solid lines and in a forward stroke as shown by the arrow and dotted lines.
Figure 10:
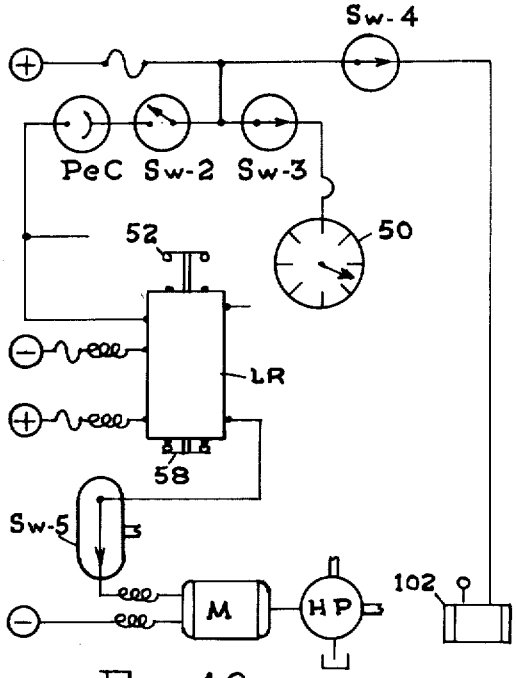

When packer P has completed its return stroke to the lead-off position shown in FIG. 2 and by solid lines in FIG. 5, it will engage switch Sw–4 which controls solenoid 102 as shown schematically in FIG. 10 to procure reversal of valve 110 from its previous "retract" position to forward position thereby causing packer P to advance from said lead-off position in its forward stroke as shown by the arrow and dotted lines in FIG. 5.

On re-attaining its parking position — e.g., FIG. 1 — there will be no room for further forward advancement. Accordingly, the pressure in the hydraulic system will build up as will be understood until it causes pressure switch Sw–5 to open the circuit to motor M as shown in FIG. 11 with the concomitant re-opening of latch relay LR. Said pressure switch Sw–5 re-closes, of course, when the pressure in the hydraulic system subsides.

Other events which occur upon return of packer P to its FIG. 1 and FIG. 4 parking position is the re-closing of switch Sw–2 which re-activates the photo-electric circuit and also the re-opening of switch Sw–3 to the timer 50. This, of course, resets timer 50 to zero.

In addition this also marks the end of a normal cycle of operations which includes as previously indicated forward and return strokes of the packer P between lead-off and parking positions; it being re-iterated that the respective strokes may not necessarily follow this specified order.

A new normal cycle of operations is thereafter commenced as and when the re-activated photo-electric cell PeC again detects waste in hopper H.

Assuming, however, that the forward progress of the packer P to parking position is impeded or blocked by accumulated impacted waste, as indicated in FIG. 6, the pressure in the hydraulic system will also be caused to rise to the point that switch Sw–5 will open thus extinguishing the motor circuit with the sequels already described.

Since packer P fails to attain parking position, switch Sw–3 will remain closed and timer 50 will resultantly remain energized continuing towards its trip position at which as shown in FIG. 12 its contact switches Sw–6, Sw–7 and Sw–8 will close; indexing switch Sw–1 being also closed at this time if previously open. Upon the closing of the contact switches Sw–6, 7 and 8, the following events occur.

Latch relay LR is activated to initiate operation of motor M. Solenoid 100 is also activated to set valve 110 at retract position causing packer P to commence its return stroke as shown by the return arrow and solid lines in FIG. 6. In addition, solenoid 104 is activated setting spring-loaded ram valve 120 at forward position which initiates extension of ram R from packer P immediately upon its return stroke as shown by the forward arrow and solid lines in FIG. 6. Further, high pressure switch Sw–9 is now brought into the electrical and hydraulic system; as will be understood switch Sw–9 responds to a much higher pressure in the hydraulic system than does its companion switch Sw–5.

Figure 7:
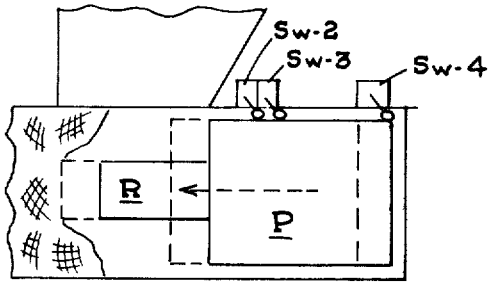
FIG. 7 is a diagrammatic view of the packer at its lead-off position with the ram fully extended therefrom as shown in solid lines and as shown by the arrow and dotted lines the packer with the extended ram is in a forward stroke.

In arriving at its lead-off position as shown by solid lines in FIG. 7, packer P engages switch Sw–4 as in the normal cycle of operations and thereafter proceeds on a forward stroke of a special cycle of operations in which ram R is fully extended as shown by dotted lines in FIG. 7. When and if packer P is successful in reaching its parking position by driving out the impacted waste, all timer circuits will, of course, be extinquished and pressure will build up in the hydraulic system until it causes low pressure switch Sw–5 to open the circuit to motor M with the resultant re-opening of latch relay LR; the other events contemporaneously occurring being the same as previously described when packer P reaches parking position, under normal conditions, namely, re-closing of switch Sw–2 which re-activates photo-electric cell circuit in addition to the re-opening of switch Sw–3 which de-activates timer 50.

Thereafter, as and when packer P proceeds on a return stroke initiated, for example, by photo-electric cell PeC, ram R will retract therein since valve 120 is returned by its spring to retract position. When packer P arrives at its lead-off position the special cycle of operations will be ended and packer P will again revert to normal cycling.

If, however, packer P is prevented by the impacted waste from reaching its parking position during the special cycle of operations in which the ram R is extended as in FIG. 7, pressure will again build up in the hydraulic system to the level at which it causes switch Sw–9 to open the circuit to motor M with the resultant re-opening of latch relay LR. Time 50 remains activated but since motor M has stopped switch Sw–1 is now open and switches Sw–7 and 8 are removed from the circuit as is switch Sw–9. Thereafter, when the pressure in the hydraulic system subsides, switch Sw–5 re-closes and with switch Sw–6 remaining closed, motor M immediately restarts. Solenoid 100 is again activated as aforesaid and packer P commences on a return stroke. Ram R will then retract therein since spring-loaded valve 120 is at retract position. On arriving at its lead-off position packer P will engage switch Sw–4 as aforesaid and then proceed on the forward stroke of a normal cycle with ram R retracted. Thereafter, if packer is again stalled if will then be re-cycled in the same manner as stated hereinabove.

What I claim is:

1. Waste compacting apparatus comprising:

a hopper;

a compaction tunnel communicating with said hopper and providing an outlet for waste deposited therein;

a packer located and reciprocable through successive forward and return strokes to advance waste from the hopper into and through said compaction tunnel, the waste being compacted in its transit through said compaction tunnel;

a ram forming part of said packer and normally telescoped therein and retractably extendible therefrom in the direction of reciprocation of said packer; the ram having a leading end which forms a portion of that of the packer as a whole when the ram is telescoped therein;

motor means for reciprocating said packer through successive cycles of operations respectively comprising forward and return strokes, a standard cycle of operations commencing at a lead-off position with the ram telescoped as aforesaid, and re-cycling means responsive upon mechanical stalling of the packer in the forward stroke of a standard cycle of operations, to terminate said forward stroke, return said packer to its lead-off position, and to initiate a special cycle of operations comprising forward and return strokes in which the forward stroke is effected from said lead-off position with the ram extended.

2. Waste compacting apparatus as defined in claim 1 wherein:

said re-cycling means initiates only a single special cycle in each response to mechanical stalling of the packer.

3. Waste compacting apparatus as defined in claim 1 wherein:

said re-cycling means procures extension of said ram during the return of said packer to its lead-off position after termination of said forward stroke.

4. Waste compacting apparatus as defined in claim 1 wherein said re-cycling means includes switching means:

a. for terminating the forward stroke when the packer is stalled as aforesaid;

b. for thereafter procuring return of said packer to its lead-off position;

c. for initiating extension of said ram from said packer while it is being returned to the lead-off position;

d. for thereafter initiating a forward stroke from the lead-off position with said ram extended from said packer as aforesaid, and e. for restoring said packer to standard operation upon completion of said special cycle of operations.

5. Waste compacting apparatus as defined in claim 1 wherein:

said packer has a scoop-shaped leading end for gathering waste from the hopper and directing it into said compaction tunnel during the forward stroke of the packer.

6. Waste compacting apparatus as defined in claim 1 wherein:

said compaction tunnel has a progressively reducing cross-section over a portion of its length, its widest point being at its inlet end which communicates with said hopper and which corresponds generally in area to the area of the leading end of the packer.

7. Waste compacting apparatus as defined in claim 4 wherein said switching means includes:

means for initiating retraction of said ram to its telescoped position in the packer while the packer is being returned to its lead-off position following the forward stroke of a special cycle.

8. Waste compacting apparatus as defined in claim 4 wherein:

said re-cycling means includes switching means for initiating retraction of said ram to its telescoped position in the packer while the packer is being returned to its lead-off position following the forward stroke of a special cycle;

said re-cycling means initiating only a single special cycle in each response to mechanical stalling of the packer and procures extension of said ram during the return of said packer to its lead-off position after termination of said forward stroke;

said packer has a scoop-shaped leading end for gathering waste from the hopper and directing it into said compaction tunnel during the forward stroke of the packer, and said compaction tunnel has a progressively reducing cross-section over a portion of its length, its widest point being at its inlet end which communicates with said hopper and which corresponds generally in area to the area of the leading end of the packer.

*9. Waste compaction apparatus, comprising*

*storage means for the waste,*

*a packer located in the storage means and movable in the storage means in a first direction to advance waste through the storage means and compact such waste during such advance of the waste through the storage means and movable in a direction opposite to the first direction;*

*a ram forming part of said packer and normally telescoped therein and retractably extendible therefrom in the first direction of movement of said packer, the ram having a leading end which forms a portion of that of the packer as a whole when the ram is telescoped therein;*

*motor means for reciprocating said packer through successive cycles of operation respectively comprising movement in the first direction for compacting the waste in the storage means and movement in the opposite direction, a standard cycle of operations commencing at a lead-off position with the ram telescoped as aforesaid and with the packer displaced from a position for compacting the waste in the storage means, and*

*recycling means responsive, upon mechanical stalling of the packer in the movement of a standard cycle of operations involving compacting the waste in the storage means, to initiate successive cycles of operation for advancing the waste through the storage means, said successive cycles including the termination of said movement of the packer upon the mechanical stalling of the packer; then extension of the ram from the packer in the first direction; then telescopic retraction of the ram into the packer, with the leading end of the ram forming a portion of that of the packer as a whole, upon the completion of the retractible extension of the ram from the packer or upon the exertion of a particular pressure against the ram by the waste in the storage means before the completion of the retractible extension of the ram from the packer; and then movement of the packer, with the ram in the telescoped position in the packer,*

*in the direction for compacting the waste in the storage means.*

*10. Waste compacting apparatus as set forth in claim 9, including,*

*means included in the recycling means for sensing a particular pressure of the waste against the packer to initiate the successive cycles of the operation involving the termination of the movement of the packer in the first direction for compacting the waste in the packer, then extension of the ram from the packer, then telescopic retraction of the ram into the packer, with the leading end of the ram forming a portion of that of the packer as a whole, upon the completion of the retractible extension of the ram from the packer or upon the exertion of the particular pressure against the ram by the waste in the storage means before the completion of the retractible extension of the ram from the packer, and then movement of the packer in the direction for compacting the refuse in the packer.*

*11. Waste compacting apparatus as set forth in claim 10 wherein*

*the motor means includes a first piston and a first cylinder operatively coupled to the packer for producing a movement of the packer in the first direction and in the opposite direction in the storage means and a second piston and a second cylinder operatively coupled to the ram for producing an extension of the ram from the packer in the first direction or a telescopic retraction of the ram in the opposite direction into the packer.*

*12. Waste compacting apparatus as set forth in claim 11 wherein*

*means are included for providing an operation of the motor for moving the packer in the opposite direction after the compaction of the waste in the storage means.*

*13. Waste compacting apparatus as set forth in claim 12 wherein*

*the packer has dimensions to fit snugly in the storage means and wherein the ram has dimensions to fit snugly in the packer.*

*14. Waste compaction apparatus, comprising,*

*means for storing the waste, the storage means being constructed to provide for a compacting of the waste,*

*packer means disposed in the storage means and having a particular surface for engaging the waste and constructed and movable relative to the storage means in a first direction to provide for a compacting of the waste in the storage means by engagement of the waste by the particular surface and the exertion of force by the particular surface against the waste and retractible in an opposite direction after providing for the compacting of the waste in the storage means,*

*first motor means operatively coupled to the packer means for producing a movement of the packer means in the first direction relative to the storage means to provide for a compacting of the waste in the storage means by the packer means and for producing a movement of the packer means in the opposite direction to provide a retraction of the packer means in the storage means,*

*ram means disposed in the packer means and having a particular surface normally disposed in flush relationship with the particular surface of the packer means and provided with an area less than the area of the particular surface of the packer means, the ram means being extensible in the first direction through a particular distance from the particular surface of the packer means to displace the particular surface of the ram means from the particular surface of the packer means to provide for a further compacting of the waste in the storage means by the ram means and being movable in the opposite direction to telescope the ram means into the flush relationship with the particular surface of the packer means,*

*second motor means operatively coupled to the ram means for producing an extension of the ram means in the first direction through the particular surface from the packer means and a movement of the ram means in the opposite direction to telescope the ram means into the flush relationship with the particular surface of the packer means,*

*first control means for initiating an operation of the first motor means to produce a movement of the packer means in the first direction for a compacting of the waste by the packer means,*

*second control means responsive to the stalling of the first motor means during the movement of the packer means in the first direction for discontinuing the operation of the first motor means in producing a compaction of the waste by the packer means and for thereafter initiating an operation of the second motor means to obtain an extension of the ram means in the first direction from the particular surface of the packer means,*

*third control means responsive to the extension of the ram means through the particular distance from the particular surface of the packer means, and to the production of a particular pressure against the ram means before the extension of the ram means in the first direction through the particular distance from the particular surface of the packer means, for thereafter producing an operation of the second motor means to obtain a movement of the ram means in the opposite direction into the flush relationship with the particular surface of the packer means, and*

*fourth control means responsive to the movement of the ram means in the opposite direction into the flush relationship with the particular surface of the packer means for initiating an operation of the first motor means to produce a further movement of the packer means in the first direction for a compacting of the waste by the packer means and for subsequent operations of the first and second control means.*

*15. Waste compacting apparatus as set forth in claim 14 wherein*

*the first motor means includes a first piston and a first cylinder and the second motor means includes a second piston and a second cylinder.*

*16. Waste compacting apparatus as set forth in claim 14 wherein*

*the first control means is responsive to a particular pressure by the waste against the particular surface of the packer means for discontinuing the operation of the first motor means in producing the movement of the packer means in the first direction for a compaction of the waste by the packer means and for thereafter initiating an operation of the second motor means in extending the ram means in the first direction.*

*17. Waste compaction apparatus as set forth in claim 16 wherein*

*fifth control means are responsive to a particular compaction of the waste by the packer means to produce*

*an operation of the first motor means to move the packer means in the storage means in the opposite direction.*

*18. Waste compaction apparatus as set forth in claim 14, including,*

*means operatively associated with the first, second, third and fourth control means for obtaining the operation in sequence of the first, second, third and fourth control means through at least two cycles to facilitate the compaction of waste in the storage means.*

*19. Waste compaction apparatus as set forth in claim 18, including,*

*means responsive to the compacting of the waste in the storage means during the operation of the first, second, third and fourth control means through the at least two cycles to produce a movement of the packer means in the storage means in the opposite direction upon the production of a particular packing by the packer means of the waste in the storage means.*

*20. Waste compacting apparatus as set forth in claim 18*

*wherein the packer means has dimensions and a configuration to fit snugly in the storage means and wherein the ram means has dimensions and a configuration to fit snugly in the storage means.*

*21. Waste compacting apparatus, comprising,*

*storage means for the waste,*

*packer means disposed in the storage means and having a particular surface for engaging the waste and constructed and movable relative to the storage means in a first direction to provide for a compaction of the waste in the storage means by engagement of the waste by the particular surface and movable in an opposite direction after providing for the compacting of the waste in the storage means,*

*first motor means operatively coupled to the packer means for producing a movement of the packer means in the first direction relative to the storage means to provide for a compacting of the waste in the storage means by the packer means and for producing a movement of the packer means in the opposite direction,*

*ram means disposed in the packer means and having a particular surface normally disposed in flush relationship with the particular surface of the packer means and provided with an area less than that of the particular surface of the packer means, the ram means being extensible in the first direction through a particular distance to displace the particular surface of the ram means through the particular distance from the particular surface of the packer means to provide for a further compacting of the waste in the storage means and being movable in the opposite direction to telescope the ram means into the flush relationship with the particular surface of the ram means,*

*second motor means operatively coupled to the ram means for producing an extension of the ram means in the first direction through the particular distance from the praticular surface of the packer means and a movement of the ram means in the opposite direction into the flush relationship with the particular surface of the packer means,*

*means operatively coupled to the first motor means for initiating an operation of the first motor means to produce a movement of the packer means in the first direction for a compaction of the waste by the first motor means,*

*first recycling means responsive to the exertion of a first particular pressure by the waste against the particular surface of the packer means for producing an operation of the first and second motor means to obtain in sequence through at least one cycle an interruption in the operation of the first motor means in producing a movement of the packer means in the first direction for compaction of the waste by the packer means and second recycling means responsive to the movement of the ram means in the first direction through the particular distance from the particular surface of the packer means, and also responsive to the exertion of a second particular pressure by the waste against the ram means before the movement of the ram means in the first direction through the particular distance from the particular surface of the packer means, for producing an operation of the second motor means to obtain a movement of the ram means in the opposite direction into the flush relationship with the particular surface of the packer means and then an operation of the first motor means to produce a movement of the packer means in the first direction for a further compaction of the waste by the packer means.*

*22. Waste compaction apparatus as set forth in claim 21 wherein*

*the first and second recycling means are operative in sequence through more than one cycle in producing an interruption in the operation of the first motor means in producing a movement of the packer means in the first direction for a compaction of the waste by the packer means, then an initiation in the operation of the second motor means to obtain an extension of the ram means in the first direction through the particular distance from the particular surface of the packer means upon the exertion of the first particular pressure by the waste against the particular surface of the packer means, then an operation of the second motor means to obtain a movement of the ram means in the opposite direction until the movement of the ram means through the particular distance from the particular surface of the packer means or until the exertion of the second particular pressure by the waste against the rams means and then an operation of the first motor means to produce a movement of the packer means in the first direction for a further compaction of the waste by the packer means.*

*23. Waste compaction apparatus as set forth in claim 22, wherein*

*the first recycling means is operative to move the packer means in the opposite direction after a particular compaction of the waste in the storage means.*

*24. Waste compaction apparatus as set forth in claim 23 wherein*

*the packer means has dimensions and a configuration to fit snugly in the storage means and the ram means has dimensions and a configuration to fit snugly in the packer means.*

*25. Waste compaction apparatus as set forth in claim 24 wherein*

*the first motor means includes a first piston and a first cylinder and the second motor means includes a second piston and a second cylinder.*

* * * * *